(12) United States Patent
Saraie et al.

(10) Patent No.: US 10,029,318 B2
(45) Date of Patent: Jul. 24, 2018

(54) MILLING CUTTER AND MACHINING METHOD USING THE SAME

(71) Applicants: DMG MORI CO., LTD., Nara (JP); Intelligent Manufacturing Systems International, San Francisco, CA (US); Advanced Research for Manufacturing Systems, LLC, Davis, CA (US)

(72) Inventors: Hidenori Saraie, Nara (JP); Eisaku Ueda, Nara (JP); Masaya Nishimoto, Nara (JP); Kazuo Yamazaki, El Macero, CA (US); Masakazu Soshi, Davis, CA (US)

(73) Assignees: DMG MORI CO., LTD., Nara (JP); Intelligent Manufacturing Systems International, San Francisco, CA (US); Advanced Research for Manufacturing Systems, LLC, Davis, CA (US)

( * ) Notice: Subject to any disclaimer, the term of this patent is extended or adjusted under 35 U.S.C. 154(b) by 284 days.

(21) Appl. No.: 14/959,914

(22) Filed: Dec. 4, 2015

(65) Prior Publication Data

US 2016/0175946 A1    Jun. 23, 2016

(30) Foreign Application Priority Data

Dec. 18, 2014    (JP) .................................. 2014-256608

(51) Int. Cl.
*B23C 5/20* (2006.01)
*B23C 5/06* (2006.01)

(52) U.S. Cl.
CPC .......... *B23C 5/06* (2013.01); *B23C 2200/208* (2013.01); *B23C 2210/0442* (2013.01);
(Continued)

(58) Field of Classification Search
CPC .......... B23C 2200/208; B23C 2220/04; B23C 2210/0442; B23C 2220/28; B23C 5/06
See application file for complete search history.

(56) References Cited

U.S. PATENT DOCUMENTS 4,616,962 A * 10/1986 Ushijima ................ B23C 5/202
                                                    407/113
4,966,500 A * 10/1990 Tsujimura ............. B23C 5/2221
                                                    407/113
(Continued)

FOREIGN PATENT DOCUMENTS

EP         0313534 A2      4/1989
EP         3112068 A1 *    1/2017   ............... B23C 5/06
(Continued)

OTHER PUBLICATIONS

European Search Report Application No. 15200260.6 dated Apr. 18, 2016.

*Primary Examiner* — Sara Addisu
(74) *Attorney, Agent, or Firm* — Miller, Mathias & Hull LLP

(57) ABSTRACT

A milling cutter is composed of a tool body having an approximately cylindrical or disk-like shape and a plurality of edge portions provided on at least an outer peripheral portion of one end of the tool body at predetermined intervals along a circumferential direction. The edge portion has a major cutting edge and a minor cutting edge that perform an operation of cutting a workpiece, the major cutting edge is positioned outside the minor cutting edge in a radial direction, and the minor cutting edge has a cutting edge angle that is an angle with respect to a plane orthogonal to a center axis of the tool body and set so as to be an elevation angle open outward in the radial direction. When surface machining is performed on a workpiece with the
(Continued)

milling cutter, a high degree of machined surface accuracy equivalent to that obtained by grinding is obtained.

3 Claims, 7 Drawing Sheets

(52) U.S. Cl.
CPC ...... *B23C 2220/04* (2013.01); *B23C 2220/28* (2013.01); *B23C 2222/14* (2013.01)

(56) References Cited

U.S. PATENT DOCUMENTS

| | | | | |
|---|---|---|---|---|
| 5,074,720 | A * | 12/1991 | Loqvist | B23C 5/202 407/114 |
| 5,707,185 | A * | 1/1998 | Mizutani | B23C 5/06 407/119 |
| 6,200,072 | B1 * | 3/2001 | Andersson | B23C 5/202 407/34 |
| 6,254,316 | B1 * | 7/2001 | Strand | B23C 5/202 407/113 |
| 7,306,409 | B2 * | 12/2007 | Stabel | B23C 5/2213 407/113 |
| 7,431,540 | B2 * | 10/2008 | Lof | B23B 27/141 407/103 |
| 7,841,810 | B2 * | 11/2010 | Heinloth | B23C 3/06 407/108 |
| 2003/0133763 | A1 * | 7/2003 | Kuroda | B23C 5/00 407/40 |
| 2007/0003384 | A1 * | 1/2007 | Smilovici | B23C 5/2221 407/113 |
| 2008/0187403 | A1 * | 8/2008 | Ertl | B23C 5/10 407/53 |
| 2008/0260475 | A1 * | 10/2008 | Bodewig | B23C 5/207 407/42 |
| 2010/0150671 | A1 * | 6/2010 | Oprasic | B23C 5/207 407/42 |
| 2012/0009029 | A1 * | 1/2012 | Saji | B23C 5/109 407/67 |
| 2014/0193216 | A1 * | 7/2014 | Maeta | B23C 5/207 407/113 |
| 2014/0212229 | A1 * | 7/2014 | Diepold | B23C 5/202 407/42 |
| 2015/0043981 | A1 * | 2/2015 | Nagami | B23C 5/06 407/113 |
| 2015/0139743 | A1 * | 5/2015 | Ballas | B23C 5/109 407/48 |

FOREIGN PATENT DOCUMENTS

| | | | | |
|---|---|---|---|---|
| JP | 2002200518 | A * | 7/2002 | ............... B23C 5/00 |
| JP | 2005111651 | A * | 4/2005 | |
| JP | 2007319990 | A | 12/2007 | |
| JP | 2008036795 | A * | 2/2008 | ............... B23C 5/06 |
| JP | 2010131697 | A | 6/2010 | |
| JP | 2010269407 | A | 12/2010 | |
| JP | 2015110269 | A * | 6/2015 | ............. B23C 5/207 |
| WO | WO 2010150907 | A1 * | 12/2010 | ............... B23C 5/06 |

* cited by examiner

MILLING CUTTER AND MACHINING METHOD USING THE SAME

BACKGROUND

Field of the Disclosure

The present disclosure relates to a milling cutter with which a machined surface having a high degree of surface accuracy is obtained and to a machining method using the milling cutter.

Background of the Disclosure

Grinding has been generally known as a machining method capable of finishing a machined surface of a workpiece with high accuracy in terms of surface accuracy such as surface roughness. However, in recent years, intensive studies have been made for obtaining a surface accuracy equivalent to that obtained by grinding by machining using a milling cutter, that is, by milling, for the purpose of shortening machining time.

Meanwhile, a problem has been pointed out that, in a case where a cast iron is cut by normal milling, graphite exposed on a machined surface falls down during cutting and recesses are formed at the portions where the graphite has been present, and the recesses prevent obtaining a desired accuracy in terms of surface roughness.

Accordingly, in order to solve this problem, there has been proposed a machining method, as disclosed in Japanese Unexamined Patent Application Publication No. 2007-319990, as a milling method capable of finishing a workpiece surface with high accuracy in terms of surface roughness, though the machining method is for a case where the workpiece is a spherical graphite cast iron.

This machining method is a cutting method in which a surface of a spherical graphite cast iron is modified by causing at least one tool having a major cutting edge and a minor cutting edge to cut into the surface of the spherical graphite cast iron and relatively moving the tool and the spherical graphite cast iron. In this method, the speed of the relative movement of the tool and the spherical graphite cast iron (cutting speed) is set at 600 m/min or more and graphite on the surface of the spherical graphite cast iron is covered with a matrix structure surrounding the graphite. According to this machining method, when the cutting speed is set at 600 m/min or more, plastic flow occurs in a surface layer of the matrix structure of the spherical graphite cast iron, and the graphite is covered with a layer of the matrix structure plastic flow. Therefore, although the surface of the graphite cast iron is still slightly rough, local formation of an extremely low recessed portion is prevented, and therefore a machined surface equivalent to a polished surface obtained by grinding is achieved.

SUMMARY OF THE DISCLOSURE

However, since the cutting speed in the above-described conventional machining method is set at a very high cutting speed: 600 m/min or more (preferably, 800 to 3000 m/min), the machining method has problems that the tool life is extremely short and that the possibility that the tool is damaged is high. Even when a CBN (cubic boron nitride) tool, which is known as a tool having a high degree of hardness, is used, the typically recommended cutting speed for a case where the workpiece is a spherical graphite cast iron is 500 m/min or less. Further, in a case where the tool is a milling cutter, the tool tends to be easily damaged at a high cutting speed because intermittent machining is performed.

Therefore, the above-described conventional machining method has problems that the tool life is short and machining cost is therefore increased correspondingly to tool cost and that the workpiece becomes a defective product if the tool is damaged.

The present disclosure has been achieved in view of the above-described circumstances, and an object thereof is to provide a milling cutter with which a high degree of machined surface accuracy equivalent to that obtained by grinding is obtained without applying excessive load to the milling cutter, and a machining method using the milling cutter.

The present disclosure, for solving the above-described problems, relates to a milling cutter including a tool body having an approximately cylindrical or disk-like shape and a plurality of edge portions provided on at least an outer peripheral portion of one end of the tool body at predetermined intervals along a circumferential direction, at least one of the edge portions having a major cutting edge and a minor cutting edge performing an operation of cutting a workpiece, the major cutting edge being positioned outside the minor cutting edge in a radial direction, the minor cutting edge having a cutting edge angle with respect to a plane orthogonal to a center axis of the tool body, and the cutting edge angle being an elevation angle open outward in the radial direction, and the present disclosure also relates to a machining method for performing surface machining on a workpiece with the milling cutter.

As described above, on the milling cutter of the present disclosure, the edge portion has the major cutting edge and the minor cutting edge performing an operation of cutting a workpiece, and the major cutting edge is positioned outside the minor cutting edge in the radial direction. Therefore, when the milling cutter is rotated and the position of the milling cutter is set at such a position as to make a cut in the workpiece, and then the milling cutter and the workpiece are relatively moved in a feed direction that is orthogonal to the center axis of the tool body, a portion of the workpiece corresponding to a feed amount for one edge portion is machined by the major cutting edge and the minor cutting edge.

The major cutting edge mainly cuts a thickness corresponding to the feed amount along the feed direction, while the minor cutting edge cuts an area corresponding to the feed amount and the cutting edge angle thereof, which area is a slight area set on a machining plane since the cutting edge angle is set so as to be an elevation angle open outward in the radial direction. In this process, since cutting allowance for the minor cutting edge is very small, plastic flow occurs in a surface layer of a machined surface of the workpiece cut by the minor cutting edge without the need to increase the cutting speed of the milling cutter to an above-normal level as in the conventional art. If a recessed portion is present on the machined surface, the recessed portion is filled with the plastic flow, and thereby the machined surface is planarized.

Therefore, in performing surface machining on a workpiece with the milling cutter of the present disclosure, even if the workpiece is such that a recess is likely to be formed in a machined surface thereof due to falling of graphite (e.g., a cat iron), it is possible to obtain a machined surface having a surface accuracy equivalent to that obtained by grinding, and it is possible to obtain a machined surface having a desired surface accuracy more efficiently as compared with grinding.

Further, it is not necessary to set the cutting speed to such a high speed as is required in the conventional art and a high degree of surface accuracy is obtained at a normal cutting speed. Therefore, it is not necessary to apply excessive load to the edge portions of the milling cutter, which makes it possible to prevent the tool life of the milling cutter from being shortened and avoid increase in machining cost. Further, since the possibility that the milling cuter is damaged is lower as compared with the conventional art, it is also possible to avoid the problem that the workpiece becomes a defective product due to damage of the milling cutter.

Note that, in order to obtain a good surface accuracy by the plastic flow, it is preferred that the cutting edge angle of the minor cutting edge is in the range of 0.025 degree to 0.11 degree, and it is preferred that the length of the minor cutting edge is in the range of 2 mm to 4 mm.

If the cutting edge angle of the minor cutting edge is smaller than 0.025 degree, good plastic flow is not obtained because the area cut by the minor cutting edge is too small. To the contrary, if the cutting edge angle of the minor cutting edge is greater than 0.11 degree, good plastic flow is not obtained because the area cut by the minor cutting edge is too large. Thus, in both cases, it is difficult to obtain a good machined surface accuracy; therefore, the above-mentioned angle range is preferred. Note that, as for the case where the cutting edge angle of the minor cutting edge is greater than 0.11 degree, there is another disadvantage that the machined surface becomes rougher due to large cutting resistance.

Further, if the length of the minor cutting edge is smaller than 2 mm, good plastic flow is not obtained, while, if the length is greater than 4 mm, the machined surface becomes rougher due to large cutting resistance. Therefore, the above-mentioned length range is preferred.

Further, the present disclosure also relates to a machining method for performing surface machining on a workpiece with a milling cutter,
the milling cutter including a tool body having an approximately cylindrical or disk-like shape and a plurality of edge portions provided on at least an outer peripheral portion of one end of the tool body at predetermined intervals along a circumferential direction,
at least one of the edge portions having a major cutting edge and a minor cutting edge performing an operation of cutting the workpiece, the major cutting edge being positioned outside the minor cutting edge in a radial direction, the minor cutting edge having a cutting edge angle with respect to a plane orthogonal to a center axis of the tool body, and the cutting edge angle being an elevation angle open outward in the radial direction, and
the surface machining being performed on the workpiece with the milling cutter tilted to have a center axis tilted forward with respect to a feed direction toward the workpiece and to maintain an angle formed by the minor cutting edge of the at least one of the edge portions and a feed plane during the cutting operation to be an elevation angle open outward in the radial direction.

According to this machining method, at the time of machining, the angle formed by the minor cutting edge of the at least one of the edge portions and the feed plane during the cutting operation is maintained to be an elevation angle open outward in the radial direction. Therefore, as described above, plastic flow occurs in a surface layer of a machined surface of the workpiece cut by the minor cutting edge without the need to increase the cutting speed of the milling cutter to an above-normal level as in the conventional art. If a recessed portion is present on the machined surface, the recessed portion is filled with the plastic flow, and thereby the machined surface is planarized. Thus, even when the workpiece is such that a recess is likely to be formed in a machined surface thereof due to falling of graphite (e.g., a cast iron), it is possible to obtain a machined surface having a surface accuracy equivalent to that obtained by grinding, and it is possible to obtain a machined surface having a desired surface accuracy more efficiently as compared with grinding.

Further, it is not necessary to set the cutting speed to such a high speed as is required in the conventional art and a high degree of surface accuracy is obtained at a normal cutting speed. Therefore, it is not necessary to apply excessive load to the edge portions of the milling cutter, which makes it possible to prevent the tool life of the milling cutter from being shortened and avoid increase in machining cost. Further, since the possibility that the milling cutter is damaged is lower as compared with the conventional art, it is also possible to avoid the problem that the workpiece becomes a defective product due to damage of the milling cutter.

Note that, also in this machining method, in order to obtain a good surface accuracy by the plastic flow, it is preferred that the milling cutter is set so that the angle formed by the minor cutting edge of the at least one of the edge portions and the feed plane during the cutting operation is in the range of 0.025 degree to 0.11 degree.

Note that the milling cutter of the present disclosure is only required to have the above-described features, and specific modes of embodiment of the milling cutter include, for example, a face milling cutter, a side cutter, and an end mill.

As described above, according to the present disclosure, at the time of cutting, since the cutting edge angle of the minor cutting edge is set so as to be an elevation angle open outward in the radial direction, plastic flow occurs in a surface layer of a machined surface of the workpiece cut by the minor cutting edge without the need to increase the cutting speed of the milling cutter to an above-normal level as in the conventional art. Accordingly, even when the workpiece is such that a recess is likely to be formed in a machined surface thereof due to falling of graphite (e.g., a cast iron), it is possible to obtain a machined surface having a surface accuracy equivalent to that obtained by grinding, and it is possible to obtain a machined surface having a desired surface accuracy more efficiently as compared with grinding.

Further, it is not necessary to set the cutting speed to such a high speed as is required in the conventional art and a high degree of surface accuracy is obtained at a normal cutting speed. Therefore, it is not necessary to apply excessive load to the edge portions of the milling cutter, which makes it possible to prevent the tool life of the milling cutter from being shortened and avoid increase in machining cost. Further, since the possibility that the milling cutter is damaged is lower as compared with the conventional art, it is also possible to avoid the problem that the workpiece becomes a defective product due to damage of the milling cutter.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Figure 1:
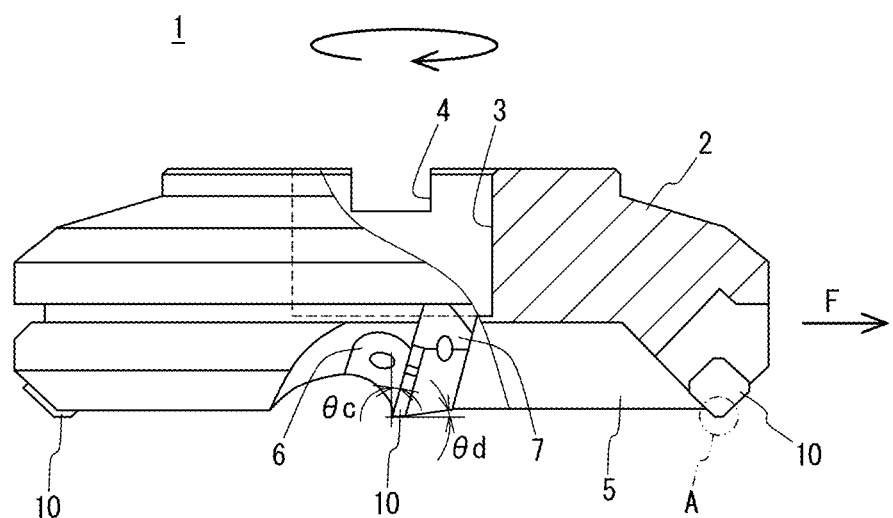
FIG. 1 is a front view of a face milling cutter according to an embodiment of the present disclosure, a part of which is shown in section.
Figure 2:
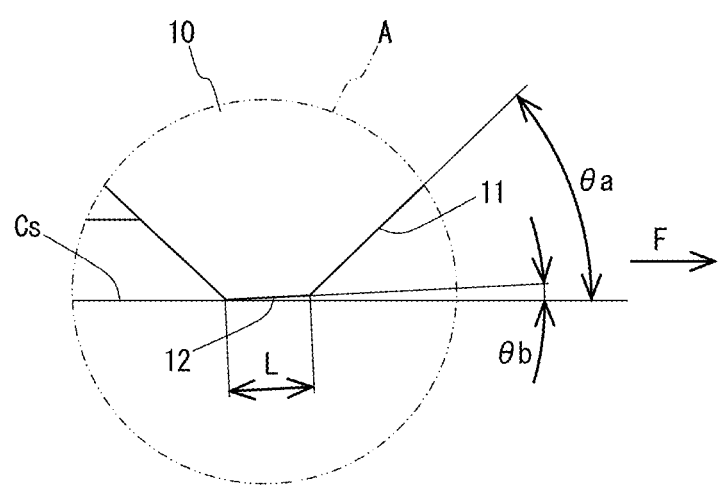
FIG. 2 is an enlarged view of the portion A in FIG. 1.

Hereinafter, a specific embodiment of the present disclosure will be described with reference to the drawings. FIG. 1 is a front view of a face milling cutter according to the embodiment, a part of which is shown in section, and FIG. 2 is an enlarged view of the portion A in FIG. 1.

As shown in FIG. 1, a face milling cutter 1 of this embodiment is composed of a tool body 2 having an approximately cylindrical (disk-like) shape, and a plurality of edge portions 10 (in this embodiment, four edge portions 10) are provided on an outer peripheral portion of the lower end of the tool body 2 at equal intervals along the circumferential direction.

The tool body 2 has an attachment hole 3 formed in a central portion thereof, which hole is open to the upper end surface of the tool body 2, and the tool body 2 is retained on an appropriate tool holder, which is not shown in the drawings, by inserting a shaft portion of the tool holder in the attachment hole 3. Note that reference numeral 4 denotes a key groove that is to be engaged with a key provided on the tool holder. Further, the tool body 2 has a recessed relief portion 5 formed in the lower surface thereof.

The edge portion 10 is a so-called insert having a rectangular shape and is fixed to the tool body 2 by attachment metal fittings 6 and 7. The edge portion 10 has cutting edges on its periphery; when each of four corner portions thereof is positioned at the lower end, a long side located outside in the radial direction functions as a major cutting edge 11 and a short side forming the corner portion functions as a minor cutting edge 12 as shown in FIG. 2.

The major cutting edge 11 has a cutting edge angle $\theta a$ that is an angle with respect to a machining plane Cs, and the minor cutting edge 12 similarly has a cutting edge angle $\theta b$ that is an angle with respect to the machining plane Cs. In this embodiment, the cutting edge angle $\theta b$ of the minor cutting edge 12 is set so as to be an elevation angle open outward in the radial direction and the cutting edge angle $\theta b$ is preferably in the range of 0.025 degree to 0.11 degree. Further, the length L of the minor cutting edge 12 is preferably in the range of 2 mm to 4 mm. Note that the cutting edge angle $\theta a$ of the major cutting edge 11 is not particularly limited; however, the cutting edge angle $\theta a$ is determined in accordance with various conditions, such as fulfillment of the conditions for the cutting edge angle $\theta b$ of the minor cutting edge 12, the shape of the insert, and a required depth of cut, and is set at about 45 degrees in this embodiment.

Further, as shown in FIG. 1, when the edge portion 10 is being fixed to the tool body 2, a surface (front surface) thereof directed in the rotational direction is tilted backward with respect to the rotational direction and has a rake angle $\theta c$ with respect to a vertical plane. Side surfaces of the edge portion 10 each have an acute angle with respect to the front surface thereof; therefore, a relief angle $\theta d$ is formed with respect to a machined surface (including the machining plane Cs).

According to the face milling cutter 1 of this embodiment having the above-described configuration, surface machining is performed on a workpiece in the following manner. Note that the face milling cutter 1 is being attached to spindle of an appropriate vertical machining center and the workpiece to be cut is being fixed on a table.

First, the face milling cutter 1 is rotated in a cutting operation direction and the face milling cutter 1 is positioned with respect to the workpiece so that the distance between the lower end position of the minor cutting edge 12 of the face milling cutter 1 and the upper surface of the workpiece is equal to a predetermined depth of cut and the face milling cutter 1 and the workpiece do not interfere with each other. Subsequently, the face milling cutter 1 and the workpiece are relatively moved in a predetermined feed direction (for example, the direction indicated by the arrow F) orthogonal to the center axis of the face milling cutter 1, whereby surface machining is performed on the workpiece.

Figure 3:
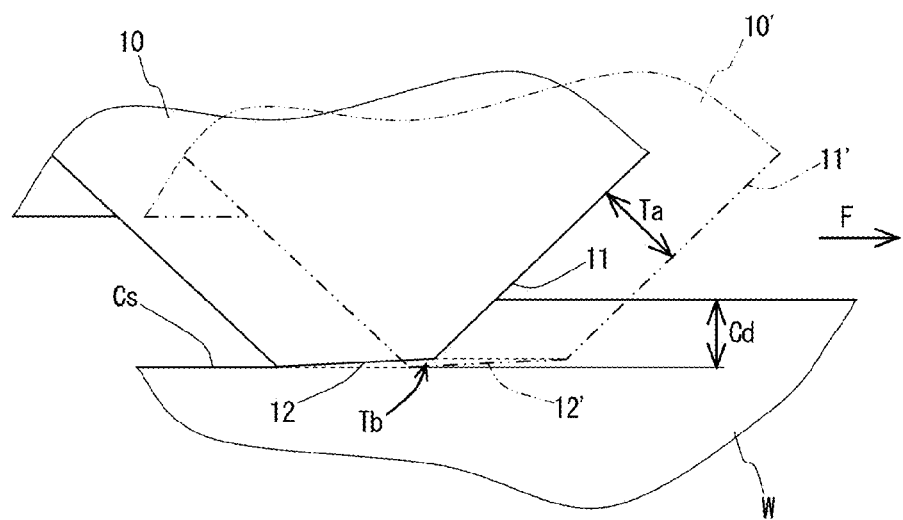
FIG. 3 is an illustration for explaining a surface machining operation using the face milling cutter according to the embodiment.

As described above, each of the edge portions 10 of the face milling cutter 1 of this embodiment has the major cutting edge 11 and the minor cutting edge 12 that perform the operation of cutting the workpiece, and the major cutting edge 11 is positioned outside the minor cutting edge 12 in the radial direction. Therefore, when the face milling cutter 1 and the workpiece are relatively moved in the feed direction, a portion of the workpiece corresponding to a feed amount for one edge portion 10 is machined by the major cutting edge 11 and the minor cutting edge 12 of each of the edge portions 10. This operation is shown in FIG. 3. In FIG. 3, reference character W denotes the workpiece. Further, the edge portion 10 indicated by the solid line is an edge portion which is currently machining the workpiece W, and the edge portion 10' indicated by the double-dot-dashed line is an edge portion which is to machine the workpiece W following the edge portion 10.

As shown in FIG. 3, the major cutting edge 11 mainly cuts an area defined by a depth of cut Cd and a thickness Ta corresponding to the feed amount for one edge along the feed direction. On the other hand, the minor cutting edge 12 cuts a slight area corresponding to the feed amount and the cutting edge angle $\theta b$ (area Tb surrounded by the minor cutting edge 12 indicated by the solid line, the minor cutting edge 12' indicated by the double-dot-dashed line, and the two parallel broken lines), which area is set on the machining plane Cs because the cutting edge angle θb is set so as to be an elevation angle open outward in the radial direction.

In this process, since the area Tb cut by the minor cutting edge 12' is very small, plastic flow occurs in a surface layer of the machining plane Cs of the workpiece W cut by the minor cutting edge 12' without the need to increase the cutting speed of the face milling cutter to an above-normal level as in the conventional art. If a recessed portion is present on the machining plane Cs, the recessed portion is filled with the plastic flow and the machining plane Cs is planarized.

Therefore, in performing surface machining on a workpiece with the face milling cutter 1 of this embodiment, even when the workpiece is such that a recess is likely to be formed in a machined surface thereof due to falling of graphite (e.g., a cast iron), it is possible to obtain a machined surface having a surface accuracy equivalent to that obtained by grinding, and it is possible to obtain a machined surface having a desired surface accuracy more efficiently as compared with grinding.

Further, since it is not necessary to set the cutting speed to such a high speed as is required in the conventional art and a high degree of surface accuracy is obtained at a normal cutting speed, it is not necessary to apply excessive load to the edge portions 10 of the face milling cutter 1, which makes it possible to prevent the tool life of the face milling cutter 1 from being shortened and avoid increase in machining cost. Further, since the possibility that the face milling cutter 1 is damaged is lower as compared with the conventional art, it is also possible to avoid the problem that the workpiece becomes a defective product due to damage of the face milling cutter 1.

Note that, in order to obtain a good surface accuracy by the plastic flow, as described above, it is preferred the cutting edge angle θb of the minor cutting edge 12 is in the range of 0.025 degree to 0.11 degree, and it is preferred that the length of the minor cutting edge 12 is in the range of 2 mm to 4 mm.

If the cutting edge angle θb of the minor cutting edge 12 is smaller than 0.025 degree, good plastic flow is not obtained because the area Tb cut by the minor cutting edge 12 is too small. To the contrary, if the cutting edge angle θb of the minor cutting edge 12 is greater than 0.11 degree, good plastic flow is not obtained because the area Tb cut by the minor cutting edge 12 is too large. Accordingly, in both cases, it is difficult to obtain a good machined surface accuracy; therefore, the above-mentioned angle range is preferred. Note that, as for the case where the cutting edge angle θb of the minor cutting edge 12 is greater than 0.11 degree, there is another disadvantage that the machined surface becomes rougher due to large cutting resistance.

Further, if the length L of the minor cutting edge 12 is smaller than 2 mm, good plastic flow is not obtained, while, if the length L is greater than 4 mm, the machined surface becomes rougher due to large cutting resistance. Therefore, the above-mentioned length range is preferred.

Next, an experimental example of surface machining using a face milling cutter of the present embodiment and a comparative example thereto are explained. Note that, in the experimental example and the comparative example, a vertical machining center was used as the machine tool for machining, and the workpiece to be cut was a bed for a machine tool and a sliding surface of the bed was machined. Note that the bed was a gray cast iron (FC300), and the sliding surface that was a machined surface had been quenched and had a hardness of Hs 60 to 75.

1. Experimental Example

The face milling cutter in the experimental example had three edge portions (inserts) 10 and the edge portions 10 were inserts of CBN. Further, the rake angle θc was 10 degrees, the relief angle θd was 5 degrees, the cutting edge angle θa of the major cutting edge 11 was 45 degrees, the cutting edge angle θb of the minor cutting edge 12 was 0.03 degree, and the length L of the minor cutting edge 12 was 4 mm. Furthermore, the cutting speed was 400 to 500 m/min, the depth of cut was 0.02 mm, and the feed amount for one edge was 0.05 mm per edge.

2. Comparative Example

Figure 7:
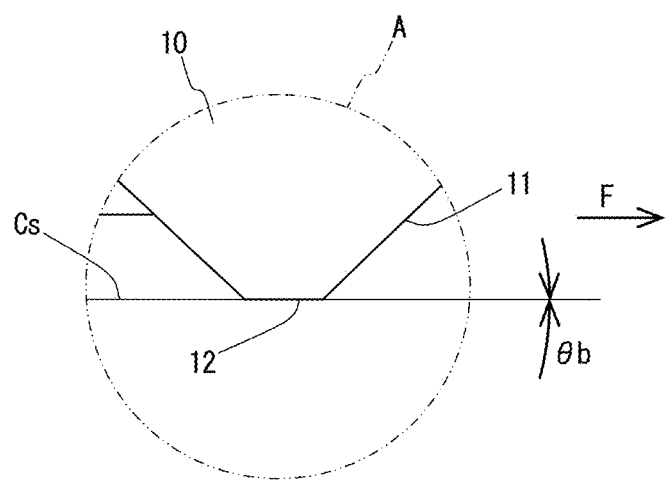
FIG. 7 is an illustration for explaining a mode of a face milling cutter according to a comparative example.

As shown in FIG. 7, the face milling cutter in the comparative example had the same specifications as the face milling cutter in the experimental example, except that the rake angle θc was 8 degrees, the relief angle θd was 7 degrees, and the cutting edge angle θb of the minor cutting edge 12 was 0 degree. The cutting speed, the depth of cut, and the feed amount for one edge were also the same as those in the experimental example.

Figure 4:
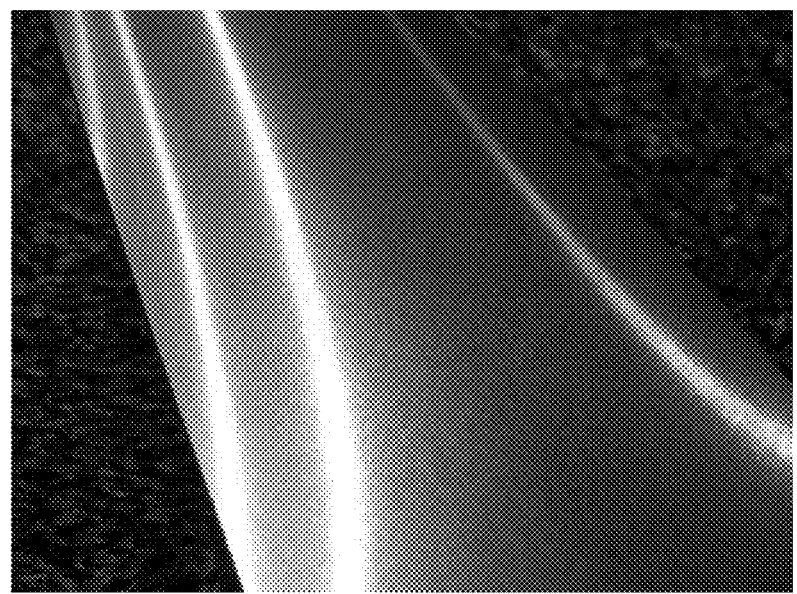
FIG. 4 is a photograph of a bed sliding surface according to an experimental example.
Figure 5:
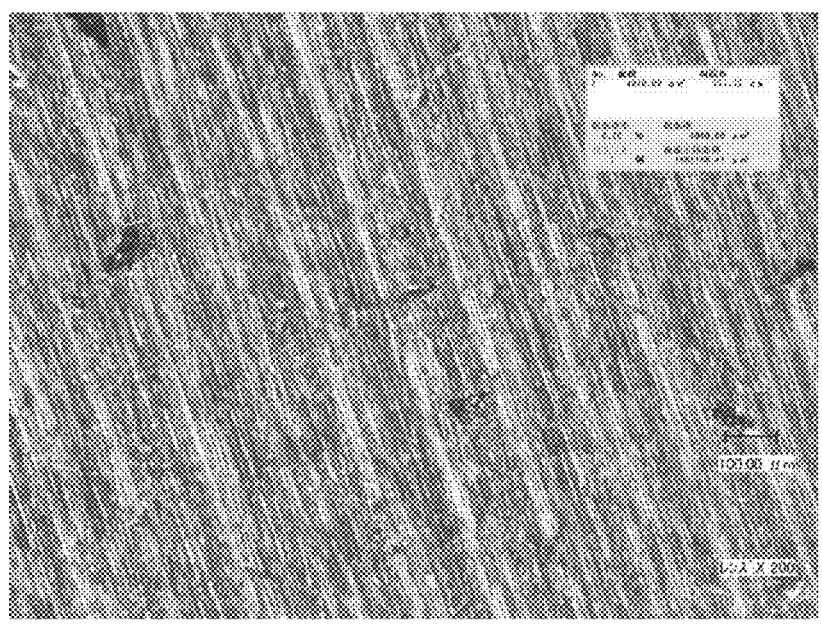
FIG. 5 is a microscope photograph of the bed sliding surface according to the experimental example.
Figure 6:
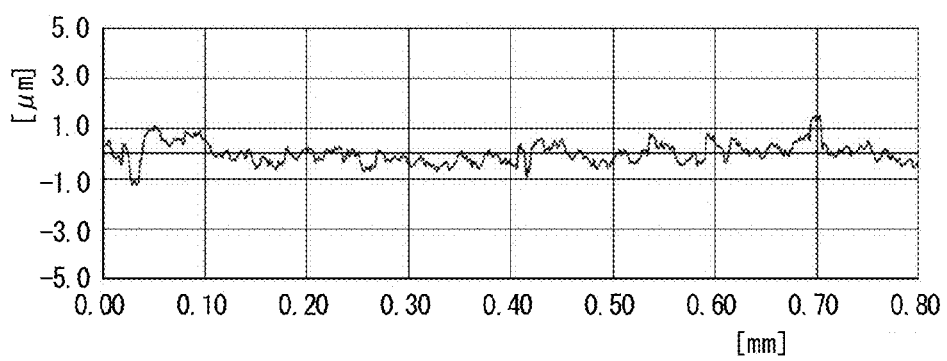
FIG. 6 is a graph showing results of measurement of surface roughness of the bed sliding surface according to the experimental example.
Figure 9:
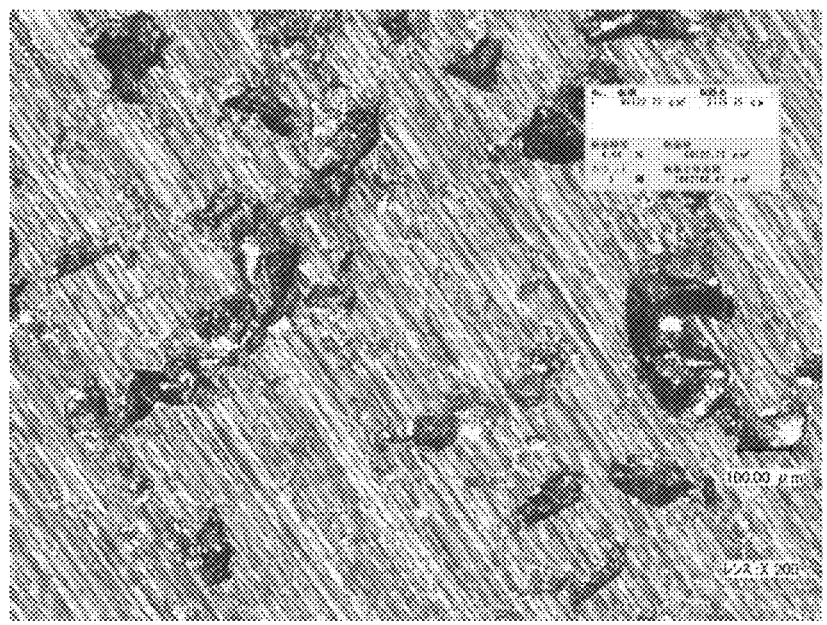
FIG. 9 is a microscope photograph of the bed sliding surface according to the comparative example.
Figure 10:
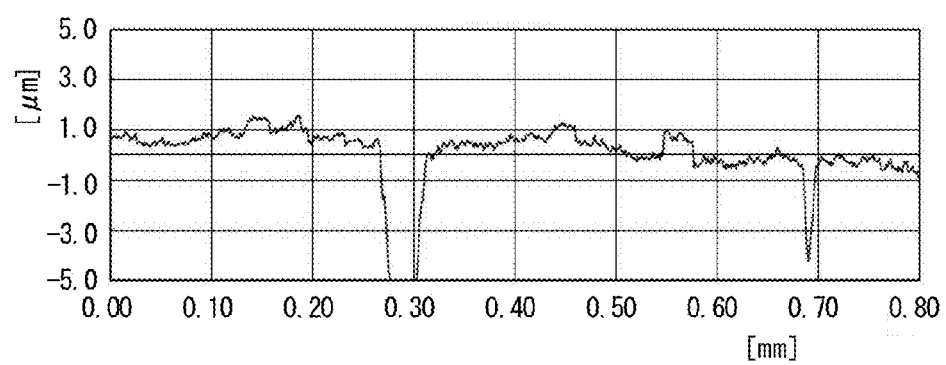
FIG. 10 is a graph showing results of measurement of surface roughness of the bed sliding surface according to the comparative example.

A photograph and a microscope photograph of the bed sliding surface obtained in the experimental example are shown in FIGS. 4 and 5, respectively, and results of measurement of the sliding surface using a surface roughness meter are shown in FIG. 6. Further, a photograph and a microscope photograph of the bed sliding surface obtained in the comparative example are shown in FIGS. 8 and 9, respectively, and results of measurement of the sliding surface using the surface roughness meter are shown in FIG. 10.

As seen from FIG. 4, the bed sliding surface obtained in the experimental example is very smooth and, as shown in FIG. 5, almost no recessed portion caused by falling of graphite is present on the surface. Therefore, as shown in FIG. 6, the surface roughness thereof is Ra 0.2 to 0.3, which is a very high degree of accuracy, and surface waviness is not observed.

Figure 8:
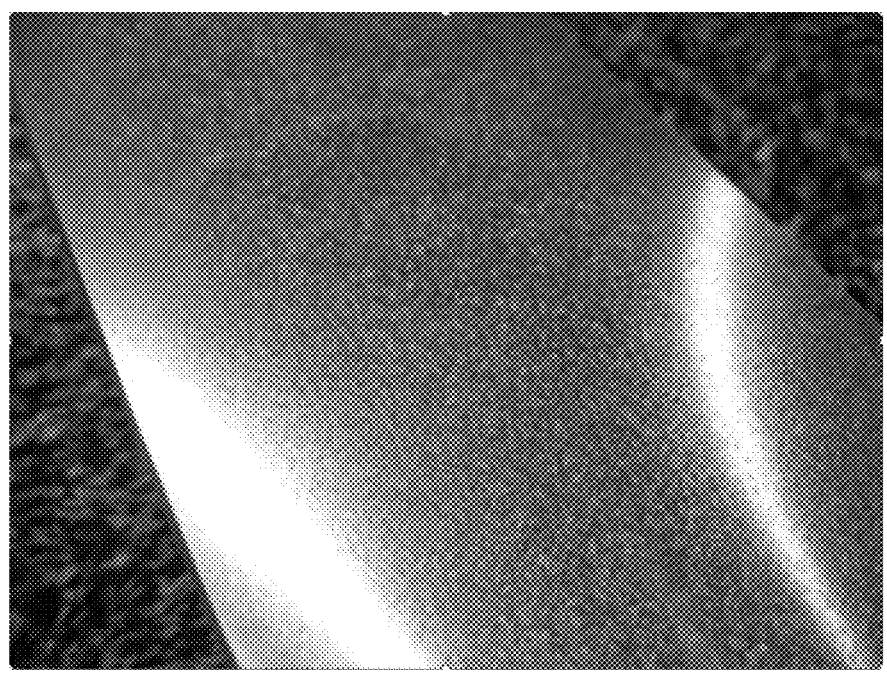
FIG. 8 is a photograph of a bed sliding surface according to the comparative example.

On the other hand, as seen from FIG. 8, the bed sliding surface obtained in the comparative example has conspicuous white spot marks thereon and is rough. The reason therefor is that, as shown in FIG. 9, graphite on the surface fell off and countless recessed portions are therefore present on the surface (in FIG. 9, dark island portions are recessed portions). As shown in FIG. 10, the surface roughness thereof is Ra 0.7 or more, which is a low degree of accuracy, deep recessed portions caused by falling of graphite are locally observed, and surface waviness is also observed.

Note that it conceivable that the reason why a recessed portion was not observed in the experimental example is that recessed portions formed due to falling of graphite which was caused by the cutting operation of the major cutting edge 11 were filled with surrounding metal by plastic flow which occurred in a surface layer of the machined surface due to the cutting operation of the minor cutting edge 12. That is, it can be said that the angle of the minor cutting edge has the biggest influence on surface smoothness.

A specific embodiment of the present disclosure has been described above; however, the present disclosure is not limited thereto and can be implemented in other modes.

Figure 11:
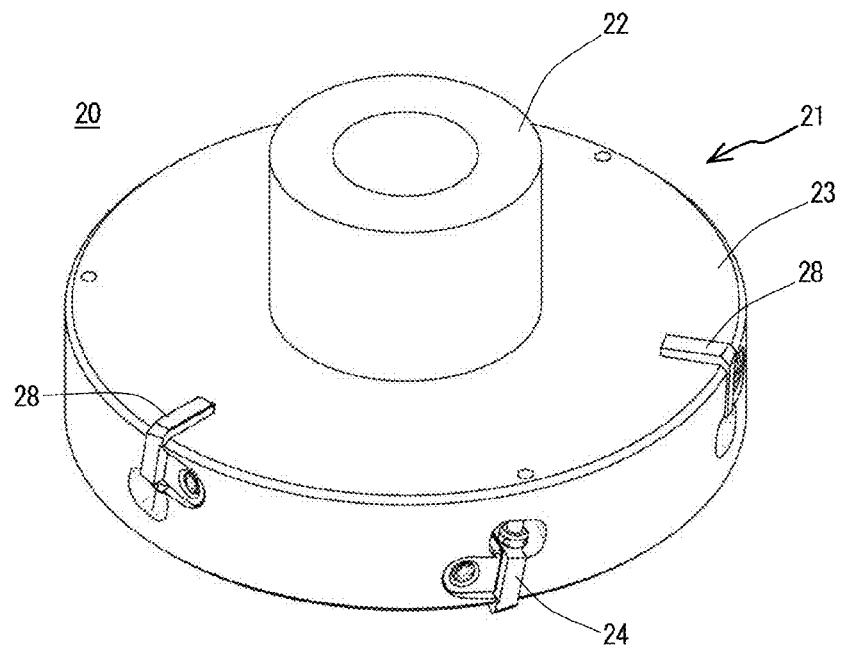
FIG. 11 is a perspective view of a special milling cutter according to another embodiment of the present disclosure.
Figure 12:
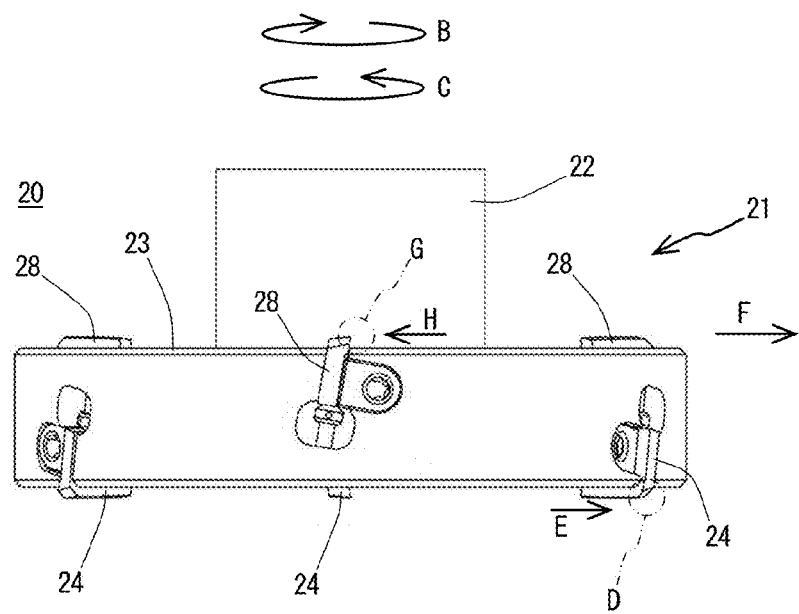
FIG. 12 is a front sectional view of the special milling cutter according to the another embodiment shown in FIG. 11.
Figure 13:
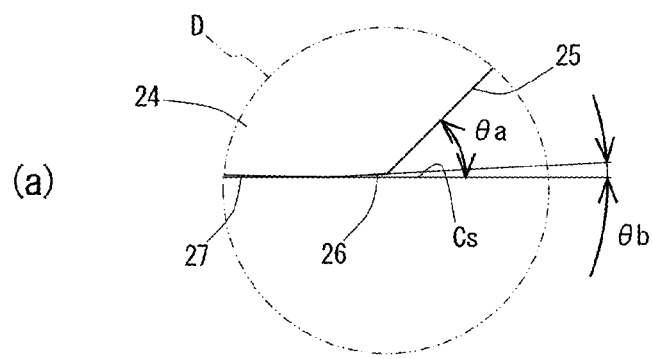
FIG. 13 shows (a) an enlarged view of the portion D in FIG. 12 as viewed in the arrow E direction and (b) an enlarged view of the portion G in FIG. 12 as viewed in the arrow H direction.
Figure 13:
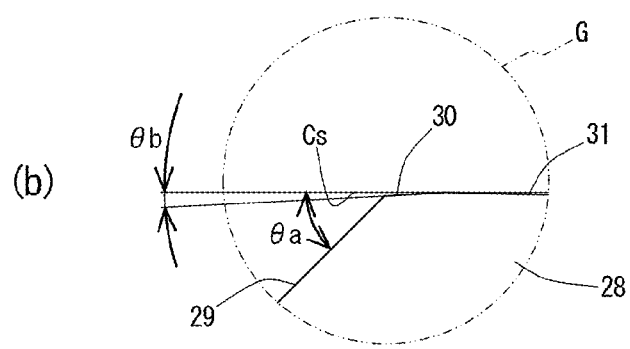
Figure 14:
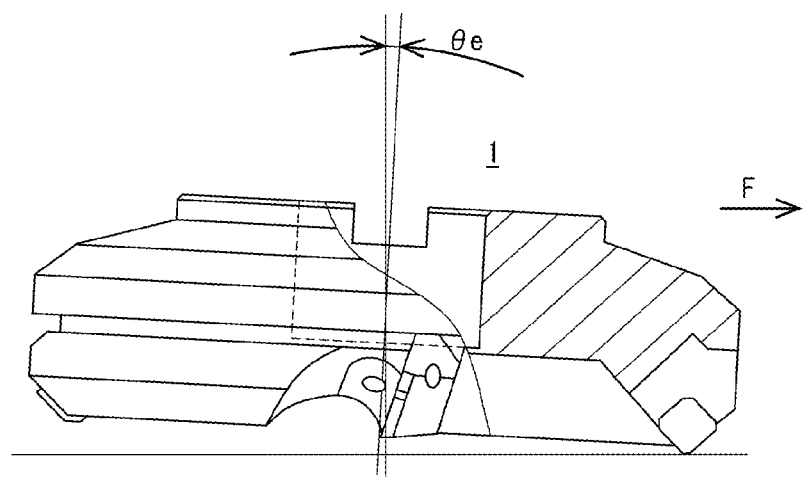
FIG. 14 is an illustration for explaining a machining method according to yet another embodiment of the present disclosure.

For example, although the milling cutter of the present disclosure is embodied as a face milling cutter in the above embodiment, it is not limited thereto and may be embodied as a side cutter, an end mill, or the like. Further, the milling cutter of the present disclosure can be embodied as a special milling cutter as shown in FIGS. 11 to 13. As shown in FIGS. 11 and 12, this special milling cutter 20 is composed of a tool body 21 consisting of a small-diameter shaft portion 22 and a large-diameter disk portion 23, a plurality of edge portions 24 (in this embodiment, three edge portions 24) provided on an outer peripheral portion of the lower end of the disk portion 23 at equal intervals along the circumferential direction, and a plurality of edge portions 28 (in this embodiment, three edge potions 28) provided on an outer peripheral portion of the upper end of the disk portion 23 at equal intervals along the circumferential direction. Note that this special milling cutter 20 can machine a surface of a workpiece with the edge portions 24 when being rotated in the arrow B direction and can machine a back surface of the workpiece with the edge portions 28 when being rotated in the arrow C direction.

FIG. 13(a) is an enlarged view of the portion D in FIG. 12 as viewed in the arrow E direction; each of the edge portions 24 has a major cutting edge 25 and a minor cutting edge 26 as shown in FIG. 13(a). FIG. 13(b) is an enlarged view of the portion G in FIG. 12 as viewed in the arrow H direction; each of the edge portions 28 has a major cutting edge 29 and a minor cutting edge 30 as shown in FIG. 13(b). Note that reference numerals 27 and 31 each denote a relief portion.

The cutting edge angles θa of the major cutting edges 25 and 29 are each approximately 45 degrees, and the cutting edge angles θb of the minor cutting edges 26 and 30 (the angles with respect to the machining plane Cs) are each set so as to be an elevation angle open outward in the radial direction and be in the range of 0.025 degree to 0.11 degree.

This special milling cutter 20 achieves effects similar to those achieved by the above-described face milling cutter 1 since the cutting edge angles θb of the minor cutting edges 26 and 30 are set in the range of 0.025 degree to 0.11 degree.

Note that the numbers of the edge portions 24 and 28 are not limited to three, and they may be any number greater than one.

Further, although, in the above embodiment, surface machining is performed with the face milling cutter 1 in a position such that its center axis is orthogonal to the machined surface, the present disclosure is not limited thereto, and machining may be performed in a state where the center axis of the face milling cutter 1 is tilted forward with respect to the feed direction. In this case, machining is performed so that an angle formed by the minor cutting edge 12 of the edge portion 10 and a feed plane (which is the same as the machining plane Cs) is maintained to be an elevation angle open outward in the radial direction.

More specifically, when the angle formed by a normal line of the feed plane (machining plane Cs) and the center axis of the face milling cutter 1 is represented by θe, the angle θf formed by the minor cutting edge 12 and the feed plane (machining plane Cs) is represented by the following equation:

θf=θb−θe, and the values of the cutting edge angle θb of the minor cutting edge 12 and the inclination angle θe are set so that θf is a positive value, in other words, θf>0.

Note that, also in this case, it is preferred that the angle θf is in the range of 0.025 degree to 0.11 degree. Therefore, it is preferred that the values of the cutting edge angle θb of the minor cutting edge 12 and the inclination angle θe are set so as to satisfy the following relationship:

0.025<θf=θb−θe<0.11.

This machining method achieves effects similar to those achieved by the above embodiment.

Additionally, on the above-described face milling cutter 1 and special milling cutter 20, it is not necessary for all of the edge portions 10, 24, 28 to have the minor cutting edge 12, 26, 30 of the above-described configurations; at least one of the edge portions 10, 24, 28 is required to have the minor cutting edge 12, 26, 30 of the above-described configurations.

What is claimed is:
1. A milling cutter comprising a tool body having an approximately cylindrical or disk-like shape and a plurality of edge portions provided on at least an outer peripheral portion of one end of the tool body at predetermined intervals along a circumferential direction,
   at least one of the edge portions having a first cutting edge and a second cutting edge performing an operation of cutting a workpiece, the first cutting edge being positioned outside the second cutting edge in a radial direction, the second cutting edge having a cutting edge angle with respect to a plane orthogonal to a center axis of the tool body, and the cutting edge angle being an elevation angle open outward in the radial direction, and
   a length of the second cutting edge is in a range of 2 mm to 4 mm and the cutting edge angle of the second cutting edge is in a range of 0.025 degree to 0.11 degree.
2. A machining method using milling cutter, wherein surface machining is performed on a workpiece with the milling cutter of claim 1.
3. A machining method using milling cutter for performing surface machining on a workpiece with a milling cutter including a tool body having an approximately cylindrical or disk-like shape and a plurality of edge portions provided on at least an outer peripheral portion of one end of the tool body at predetermined intervals along a circumferential direction,
   at least one of the edge portions having a first cutting edge and a second cutting edge performing an operation of cutting the workpiece, the first cutting edge being positioned outside the second cutting edge in a radial direction, the second cutting edge having a cutting edge angle with respect to a plane orthogonal to a center axis of the tool body, and the cutting edge angle being an elevation angle open outward in the radial direction, and
   the surface machining being performed on the workpiece with the milling cutter tilted such that a center axis tilted forward with respect to a feed direction toward the workpiece and an angle formed by the second cutting edge of the at least one of the edge portions and a feed plane during the cutting operation is maintained to be an elevation angle open outward in the radial direction and is in a range of 0.025 degree to 0.11 degree.

* * * * *